United States Patent
Iguchi et al.

(10) Patent No.: US 7,511,256 B2
(45) Date of Patent: Mar. 31, 2009

(54) PHOTOELECTRIC CONVERSION APPARATUS AND IMAGE READING APPARATUS HAVING POWER SUPPLY STOP MEANS FOR STOPPING SUPPLYING POWER TO A PART OF THE APPARATUS

(75) Inventors: Junji Iguchi, Yokohama (JP); Takehiro Yoshida, Shibuya-ku (JP); Hideya Tabeta, Kawasaki (JP); Daisuke Suga, Kawasaki (JP); Shiyunichi Fujise, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 867 days.

(21) Appl. No.: 11/083,293

(22) Filed: Mar. 17, 2005

(65) Prior Publication Data

US 2005/0206761 A1    Sep. 22, 2005

(30) Foreign Application Priority Data

Mar. 19, 2004    (JP)    ............... 2004-080226

(51) Int. Cl.
    *H01J 40/14*    (2006.01)
(52) U.S. Cl. ............... 250/214 R; 250/208.1
(58) Field of Classification Search ............. 250/214 R, 250/214.1, 208.1, 214 LA; 358/482–505; 348/257, 272, 298, 303–313; 355/53, 55, 355/67, 69

See application file for complete search history.

(56) References Cited

U.S. PATENT DOCUMENTS 5,748,340 A * 5/1998 Shimizu ................. 358/482
5,998,779 A 12/1999 Kozuka

FOREIGN PATENT DOCUMENTS

JP    5-300309 A    11/1993
JP    9-219829 A    8/1997

* cited by examiner

*Primary Examiner*—Que T Le
(74) *Attorney, Agent, or Firm*—Canon U.S.A., Inc. I.P. Division (57) ABSTRACT

A photoelectric conversion apparatus includes photoelectric conversion elements configured to receive light reflected from an original illuminated by a light source and to convert the received light into an electrical signal, an output circuit for amplifying the electrical signal from the photoelectric conversion elements and outputting the amplified signal as an image signal in a time series fashion, and a driving stop circuit for stopping driving a part of the photoelectric conversion elements or a power supply stop circuit for stopping supplying power to a part of the photoelectric conversion elements.

2 Claims, 8 Drawing Sheets

PHOTOELECTRIC CONVERSION APPARATUS AND IMAGE READING APPARATUS HAVING POWER SUPPLY STOP MEANS FOR STOPPING SUPPLYING POWER TO A PART OF THE APPARATUS

BACKGROUND OF THE INVENTION

1. Field of the Invention

The present invention relates to a photoelectric conversion apparatus for image reading, such as a facsimile machine, an image scanner, a digital copy machine, etc., and to an image reading apparatus using the photoelectric conversion apparatus.

2. Description of the Related Art

In conventional facsimile machines, image scanners, digital copy machines or the like, a unit-magnification contact image sensor or a photoelectric conversion apparatus (image reading sensor) having a CCD (charge-coupled device) is used. In such a sensor, a plurality of chips each having a photoelectric conversion function are connected and arrayed in a scanning direction.

In a photoelectric conversion apparatus disclosed in Japanese Laid-Open Patent Application No. 10-191173, electric charge generated and stored in photoelectric conversion elements is read out as a light signal to a common output line. The light signal is amplified by a preamplifier and is processed by a differential amplifier to remove a noise component therefrom. The processed light signal is then output as a video signal to an amplifier.

In another photoelectric conversion apparatus disclosed in Japanese Laid-Open Patent Application No. 5-300309, electric charge from a light-sensitive section is transferred to an analog shift register and is then output as a video signal from an output buffer.

In a further photoelectric conversion apparatus disclosed in Japanese Laid-Open Patent Application No. 9-219823, electric charge from light-sensitive elements is processed and output as a video signal via a light-sensitive voltage generation circuit and a multiplexer. More specifically, light reflected from an original (document) is received and photoelectrically converted by a photoelectric conversion element array. An output signal from the photoelectric conversion element array is transferred as a sequential pixel signal to an analog shift register through an analog switch array. The sequential pixel signal is transferred to an output buffer and is then amplified and output as a video signal.

Figure 8:
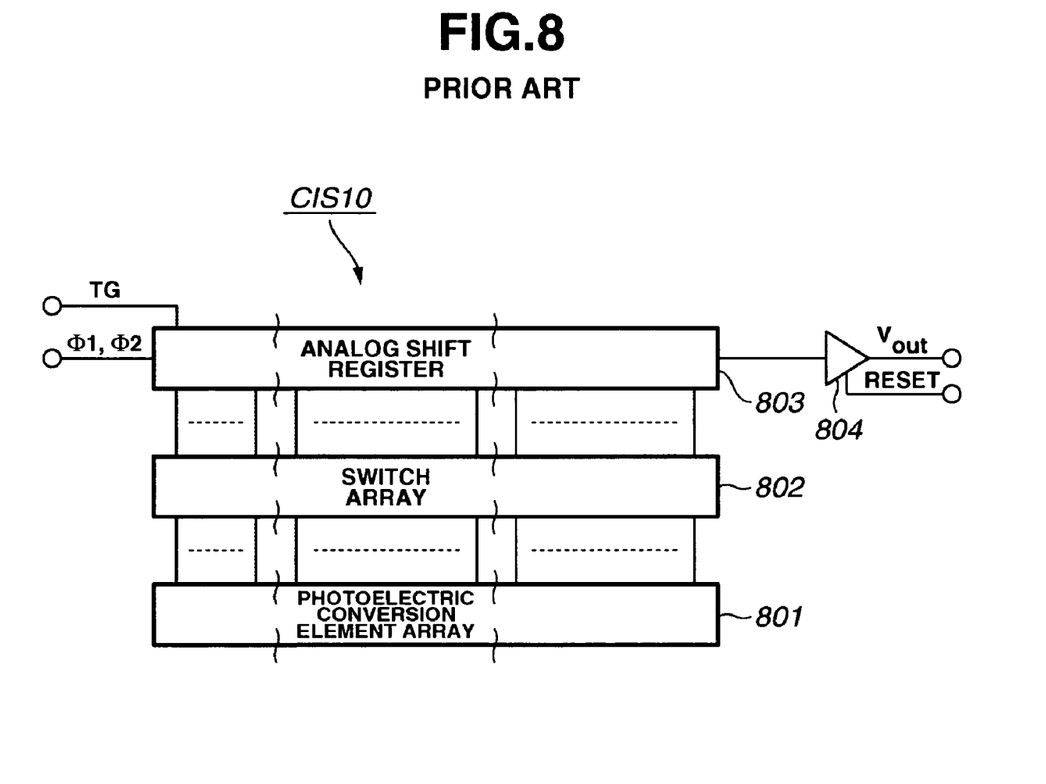
FIG. 8 is a schematic diagram showing the structure of a conventional photoelectric conversion apparatus CIS10.

FIG. 8 is a block diagram showing a conventional photoelectric conversion apparatus CIS10.

The conventional photoelectric conversion apparatus CIS10 includes a photoelectric conversion element array 801, a switch array 802, an analog shift register 803 and an output buffer 804.

In the conventional photoelectric conversion apparatus CIS10, light reflected from an original (document) is received and photoelectrically converted by the photoelectric conversion element array 801. An output signal from the photoelectric conversion element array 801 is transferred as a sequential pixel signal to the analog shift register 803 via the analog switch array 802 in accordance with a timing signal TG. The sequential pixel signal is transferred to the output buffer 804 in accordance with pulse signals $\Phi 1$ and $\Phi 2$ and is then amplified and output as a video signal $V_{out}$.

In the above-described conventional photoelectric conversion apparatus, electric charge generated and stored in photoelectric conversion elements is subjected to noise removal and amplification and is then output as a video signal in synchronization with a driving signal. In addition, in the above-described conventional photoelectric conversion apparatus, when an original (document) or the like that is narrower than the main scanning length is read, all of the chips each having a photoelectric conversion function (photoelectric conversion elements) are driven.

Accordingly, outputs of chips that really should not be treated as an image will be processed as part of an ordinary video image. Therefore, wasteful electric power, e.g., driving power for photoelectric conversion chips that are located in an area other than an effective image area, is consumed.

SUMMARY OF THE INVENTION

An aspect of the present invention is to provide a photoelectric conversion apparatus and an image reading apparatus that are capable of stopping driving photoelectric conversion chips that are located in an area other than an area corresponding to the width of an original (document), thus reducing electric power consumption when an original that is narrower than the maximum scanning length in the photoelectric conversion apparatus or the image reading apparatus is read.

Another aspect of the present invention is to provide a photoelectric conversion apparatus and an image reading apparatus that are capable of shortening a time length required for reading an original.

In one aspect of the present invention, a photoelectric conversion apparatus includes photoelectric conversion elements configured to receive light reflected from an original illuminated by a light source and to convert the received light into an electrical signal, output means for amplifying the electrical signal from the photoelectric conversion elements and outputting the amplified signal as an image signal in a time series fashion, and driving stop means for stopping driving a part of the photoelectric conversion elements.

In one aspect of the present invention, a photoelectric conversion apparatus includes photoelectric conversion elements configured to receive light reflected from an original illuminated by a light source and to convert the received light into an electrical signal, output means for amplifying the electrical signal from the photoelectric conversion elements and outputting the amplified signal as an image signal in a time series fashion, and power supply stop means for stopping supplying power to a part of the photoelectric conversion elements.

In one aspect of the present invention, an image reading apparatus includes a photoelectric conversion apparatus including photoelectric conversion elements configured to receive light reflected from an original illuminated by a light source and to convert the received light into an electrical signal, and output means for amplifying the electrical signal from the photoelectric conversion elements and outputting the amplified signal as an image signal in a time series fashion, driving stop means for stopping driving a part of the photoelectric conversion elements, detection means for detecting a size of the original, and control means for controlling the driving stop means to stop driving a part of the photoelectric conversion elements when the detection means detects that the original is narrower than a scanning length in the photoelectric conversion apparatus.

In one aspect of the present invention, an image reading apparatus includes a photoelectric conversion apparatus including photoelectric conversion elements configured to receive light reflected from an original illuminated by a light source and to convert the received light into an electrical signal, and output means for amplifying the electrical signal from the photoelectric conversion elements and outputting the amplified signal as an image signal in a time series fashion, power supply stop means for stopping supplying power to a part of the photoelectric conversion elements, detection means for detecting a size of the original, and control means for controlling the power supply stop means to stop supplying power to a part of the photoelectric conversion elements when the detection means detects that the original is narrower than a scanning length in the photoelectric conversion apparatus.

Other features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Embodiments of the invention will be described in detail below with reference to the drawings.

First Embodiment

Figure 1:
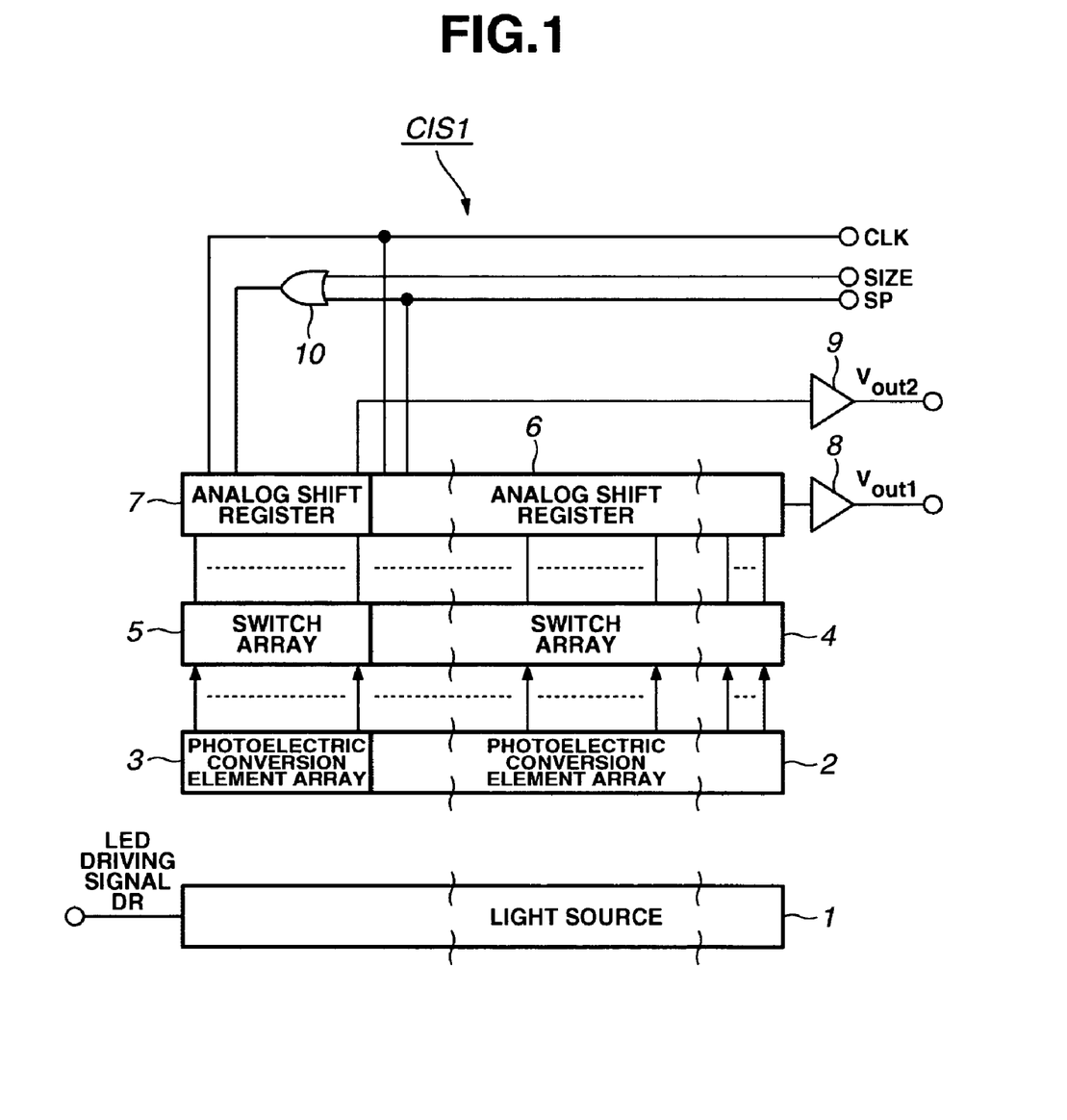
FIG. 1 is a schematic diagram showing the structure of a photoelectric conversion apparatus CIS1 according to a first embodiment of the invention.

FIG. 1 is a schematic diagram showing the structure of a photoelectric conversion apparatus CIS1 according to a first embodiment of the invention.

The photoelectric conversion apparatus CIS1 includes a light source 1, photoelectric conversion element arrays 2 and 3, switch arrays 4 and 5, analog shift registers 6 and 7, output buffers 8 and 9, and an OR circuit 10.

The photoelectric conversion apparatus CIS1 operates in accordance with a clock signal CLK, a signal SP synchronized with the clock signal CLK, an LED driving signal DR, and a signal SIZE for stopping driving photoelectric conversion chips.

An LED (light emitting diode) of the light source 1 emits light in response to the LED driving signal DR. Light from the light source 1 is reflected from an original (document) The photoelectric conversion element arrays 2 and 3 receive the reflected light from the original and generate and store electric charge. After completion of such storage, outputs of the photoelectric conversion element arrays 2 and 3 are transferred to the analog shift registers 6 and 7 via the switch arrays 4 and 5, respectively, in accordance the signal CLK and are then subjected to amplification and noise removal by the output buffers 8 and 9, respectively. Then, the output buffers 8 and 9 output signals $V_{out1}$ and $V_{out2}$, respectively, to the outside.

In addition, the photoelectric conversion element array 3, the switch array 5 and the analog shift register 7 are also driven in accordance with an output signal from the OR circuit 10. The OR circuit 10 has two inputs to which the signals SIZE and SP are respectively supplied.

Figure 2:
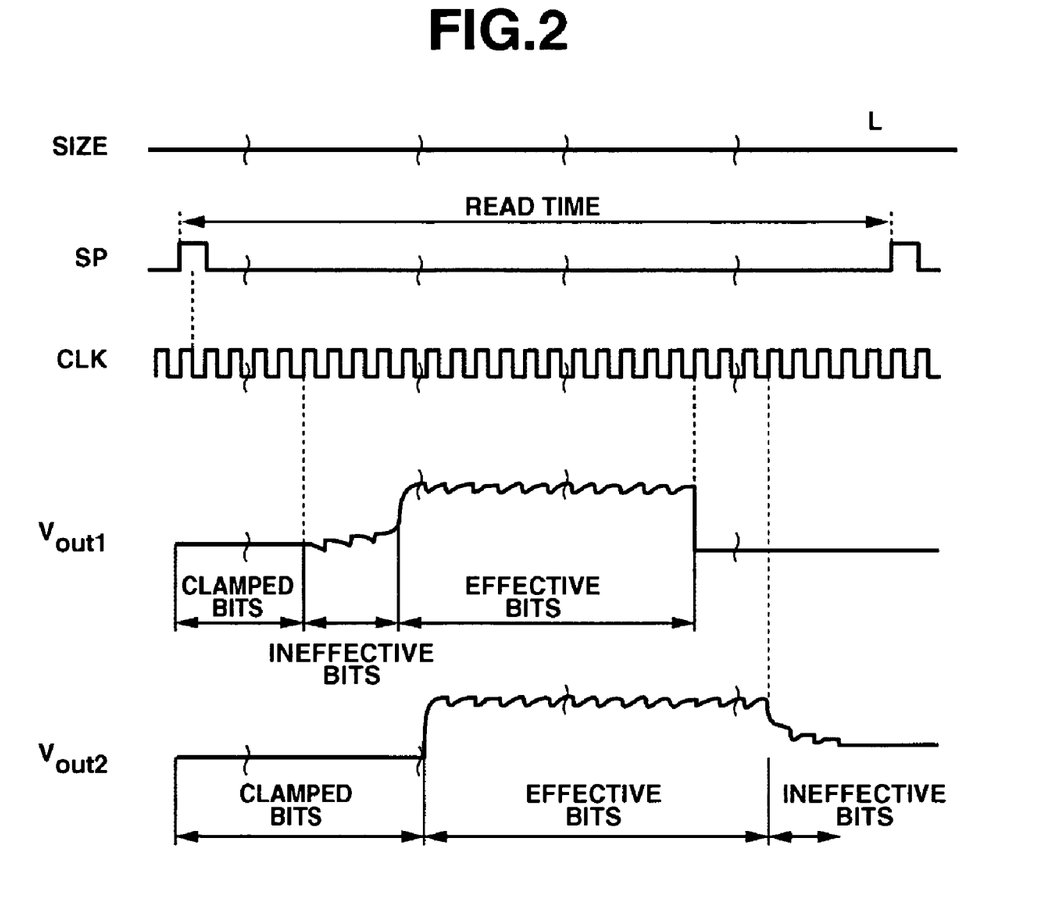
FIG. 2 is a timing chart showing timing of signals CLK, SP, SIZE, $V_{out1}$ and $V_{out2}$ in the photoelectric conversion apparatus CIS1 according to the first embodiment.

FIG. 2 is a timing chart showing timing of the signals CLK, SP, SIZE, $V_{out1}$ and $V_{out2}$ in the photoelectric conversion apparatus CIS1 according to the first embodiment.

Referring to FIG. 2, in a condition where the level of the signal SIZE is low (L), after the signal SP is input, the signal $V_{out1}$ is first output as ineffective pixel signals and is then output as effective pixel signals following dummy pixels signals in synchronization with the signal CLK. The effective pixel signals are obtained by subjecting an output signal from the photoelectric conversion element array 2 to amplification, etc. Similarly, after the signal SP is input, the signal $V_{out2}$ is first output as ineffective pixel signals and is then output as effective pixel signals in synchronization with the signal CLK. The ineffective pixel signals are obtained by subjecting an output signal from the photoelectric conversion element array 3 to amplification, etc.

In cases where the level of the signal SIZE is high (H), the level of an output signal of the OR circuit 10, which also receives the signal SP, is always high (H). Accordingly, in this case, the photoelectric conversion element array 3, the switch array 5 and the analog shift register 7 are always in a reset state.

Figure 3:
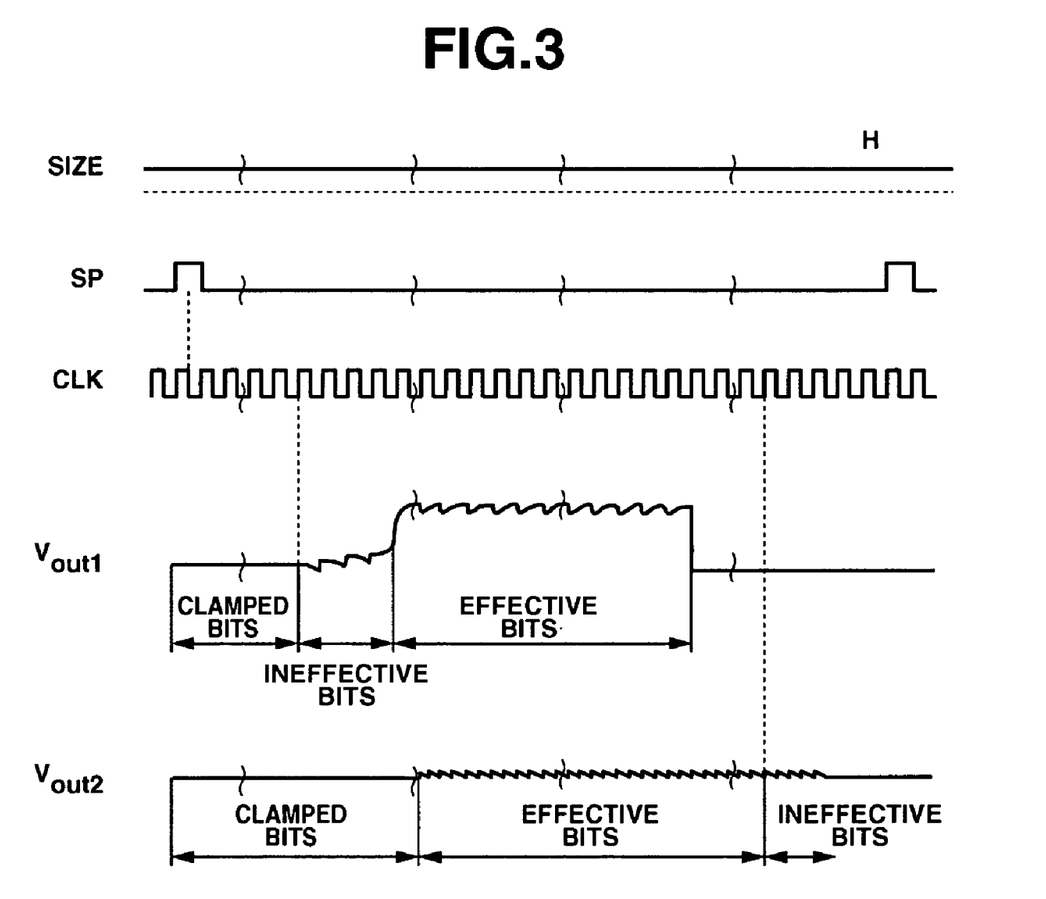
FIG. 3 is a timing chart showing timing of the signals CLK, SP, SIZE, $V_{out1}$ and $V_{out2}$ when driving of a part of the photoelectric conversion apparatus CIS1 is stopped according to the first embodiment.

FIG. 3 is a timing chart showing timing of the signals CLK, SP, SIZE, $V_{out1}$ and $V_{out2}$ when driving of a part of the photoelectric conversion apparatus CIS1 is stopped according to the first embodiment.

In the case of timing shown in FIG. 3, the signal $V_{out2}$ is not output while the signal $V_{out1}$ is output.

Figure 4:
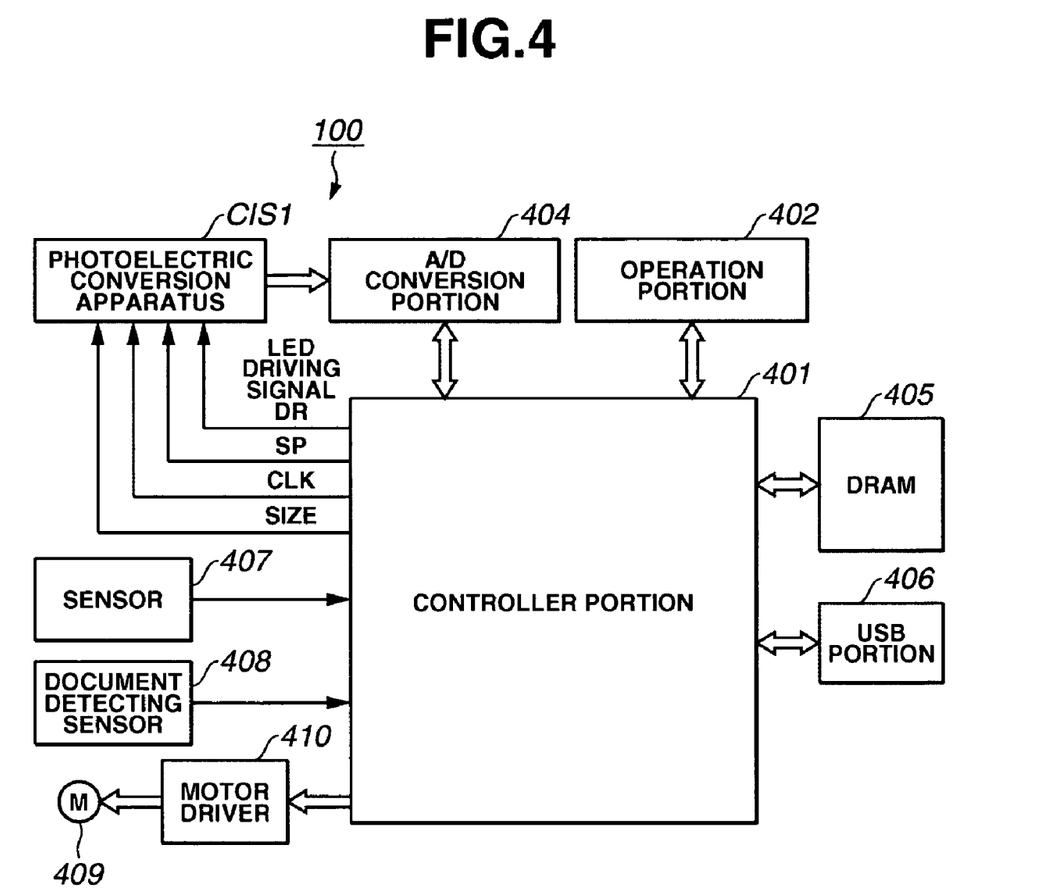
FIG. 4 is a block diagram showing an example of a scanner 100 using the photoelectric conversion apparatus CIS1 according to the first embodiment.

FIG. 4 is a block diagram showing an example of a scanner 100 using the photoelectric conversion apparatus CIS1 according to the first embodiment.

The scanner 100 includes a controller portion 401, an operation portion 402, an A/D conversion portion 404, a DRAM (dynamic random access memory) 405, a USB portion 406, a sensor 407, a document detecting sensor 408, a motor 409 and a motor driver 410 in addition to the photoelectric conversion apparatus CIS1.

The controller portion 401 controls the whole scanner 100 and stores therein a program for controlling the scanner 100. The operation portion 402 receives key inputs from a user of the scanner 100 and outputs instructions to the controller portion 401. The A/D conversion portion 404 converts the signals $V_{out1}$ and $V_{out2}$ output from the photoelectric conversion apparatus CIS1 into digital data and transfers the digital data to the controller portion 401.

The DRAM 405 temporarily stores video data output from the controller portion 401. The USB portion 406 is an interface portion for the outside that is compliant with the USB (Universal Serial Bus) standard.

The sensor 407 detects whether the photoelectric conversion apparatus CIS1 is located in its home position. The document detecting sensor 408 detects the size of an original (document). The motor 409 moves the photoelectric conversion apparatus CIS1 to scan and read an image of the original. The motor driver 410 drives the motor 409.

Operation of the scanner 100 according to the first embodiment is described below.

The scanner 100 shown in FIG. 4 starts a reading operation in response to an instruction from the operation portion 402 or a PC (personal computer) connected to the USB portion 406.

Figure 5:
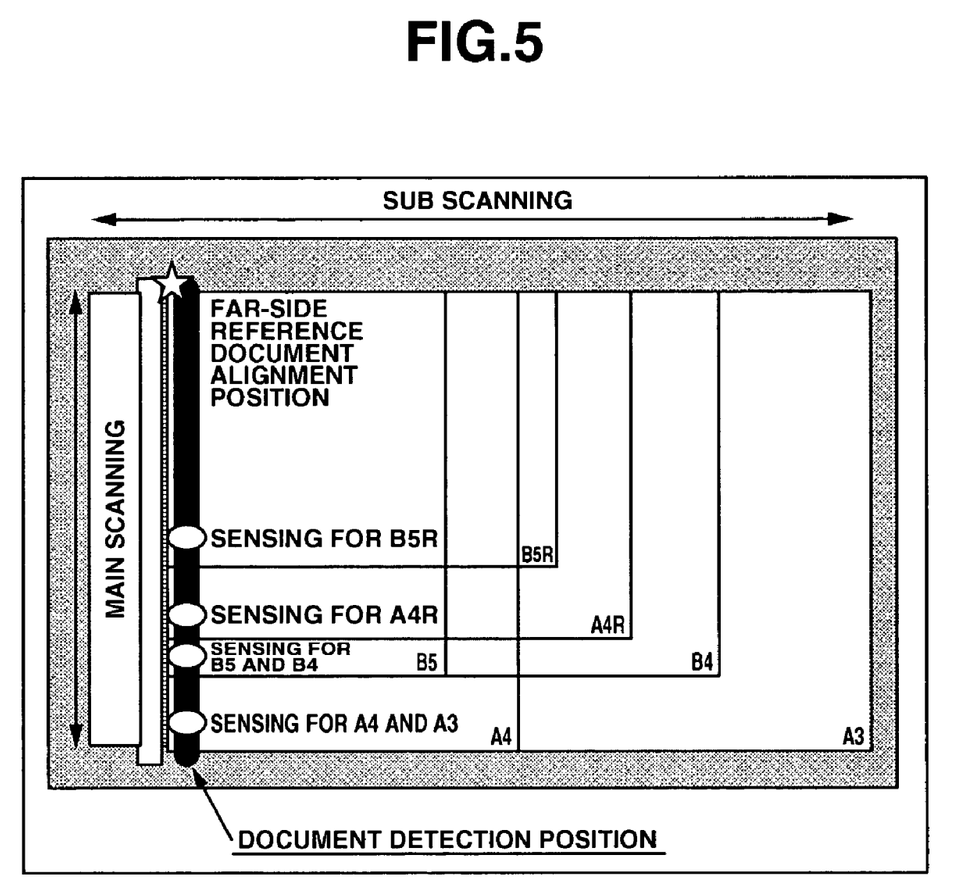
FIG. 5 is a diagram illustrating sensing positions of a document detecting sensor in the scanner 100 according to the first embodiment.

FIG. 5 is a diagram illustrating sensing positions of the document detecting sensor 408 in the scanner 100 according to the first embodiment.

Figure 6:
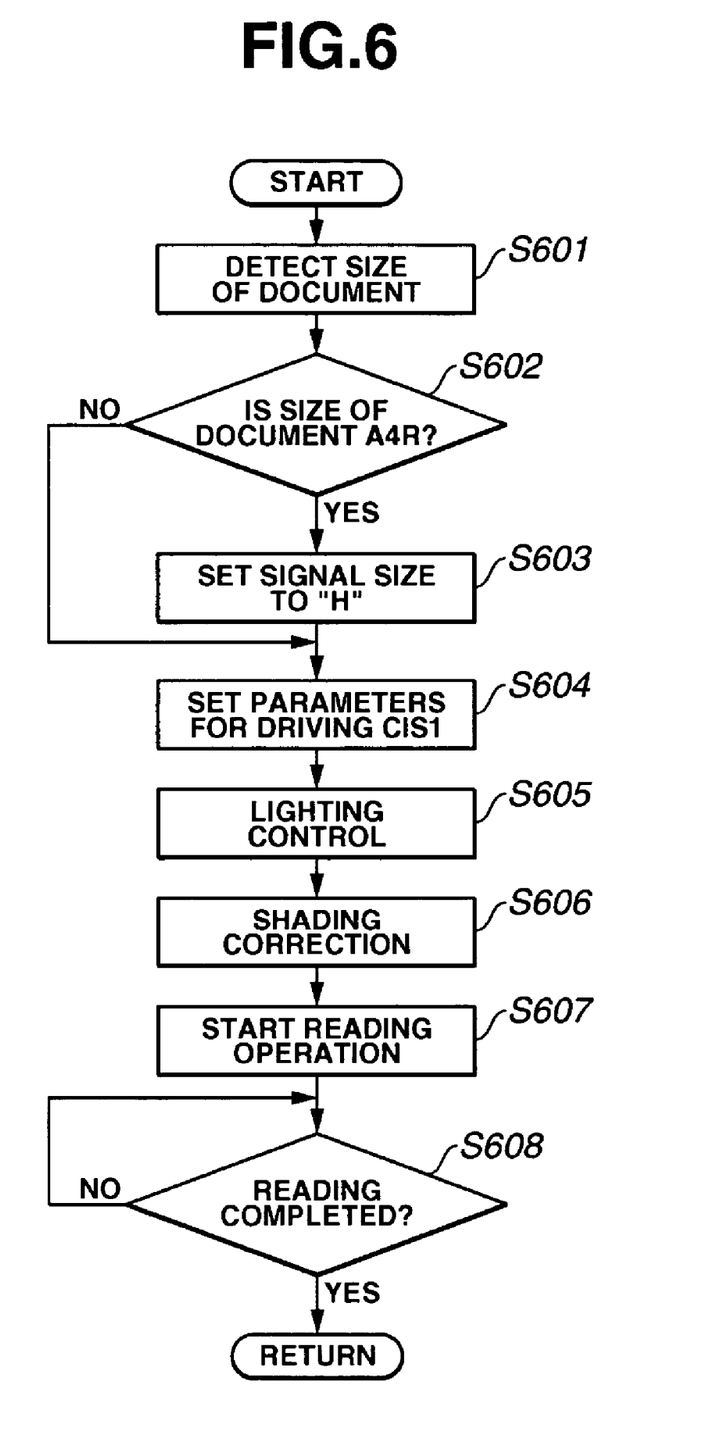
FIG. 6 is a flow chart illustrating a driving operation of the photoelectric conversion apparatus CIS1 according to the first embodiment.

FIG. 6 is a flow chart illustrating a driving operation of the photoelectric conversion apparatus CIS1 according to the first embodiment.

Referring to FIG. 6, at step S601, the controller portion 401 causes the document detecting sensor 408 to detect the size of an original based on the sensing positions shown in FIG. 5. At step S602, the controller portion 401 compares the size (width) of the original with the main scanning length in the photoelectric conversion apparatus CIS1. If the size (width) of the original is shorter than the main scanning length in the photoelectric conversion apparatus CIS1, the controller portion 401 sets the level of the signal SIZE high (H).

For example, if the document detecting sensor 408 has detected paper size A4R based on the sensing positions shown in FIG. 5, the size of the original in the main scanning direction is shorter than the main scanning length in the photoelectric conversion apparatus CIS1. Therefore, the level of the signal SIZE is set high (H). Accordingly, the photoelectric conversion element array (photoelectric conversion chips) 3, the switch array 5 and the analog shift register 7, which correspond in position to an excess length section of the photoelectric conversion apparatus CIS1 beyond the size A4R, come into a reset state. If the size of the original is A4R or larger, the controller portion 401 keeps the level of the signal SIZE low (L) so as to perform image reading with the main scanning length in the photoelectric conversion apparatus CIS1.

At step S604, the controller portion 401 sets parameters for driving the photoelectric conversion apparatus CIS1 (an interval between two rises of the signal SP, i.e., a read time, etc.). At step S605, the controller portion 401 causes the photoelectric conversion apparatus CIS1 to read a white reference plate while varying a period of the LED driving signal DR. Then, the controller portion 401 causes the A/D conversion portion 404 to digitize the output signals $V_{out1}$ and $V_{out2}$ from the photoelectric conversion apparatus CIS1. After that, the controller portion 401 adjusts a period of the LED driving signal DR and determines various parameters such that the output signals $V_{out1}$ and $V_{out2}$ fall within the dynamic range of the A/D conversion portion 404. These parameters are stored into the DRAM 405.

At step S606, the controller portion 401 performs shading correction using the parameters obtained at step S605. Parameters used for shading correction are also stored into the DRAM 405. At step S607, the controller portion 401 drives the motor 409 and the motor driver 410 while taking into account a distance of the photoelectric conversion apparatus CIS1 to the reference position of the senor 407 to start a reading operation.

During the reading operation, an image read by the photoelectric conversion apparatus CIS1 is temporarily buffered in the DRAM 405 via the controller portion 401 and is then sequentially transferred via the USB portion 406 to a PC (personal computer) connected to the scanner 100. At step S608, when the reading operation is completed, the controller portion 401 moves the photoelectric conversion apparatus CIS1 to the home position to be detected by the sensor 407 and then ends the driving operation of the photoelectric conversion apparatus CIS1.

Second Embodiment

Figure 7:
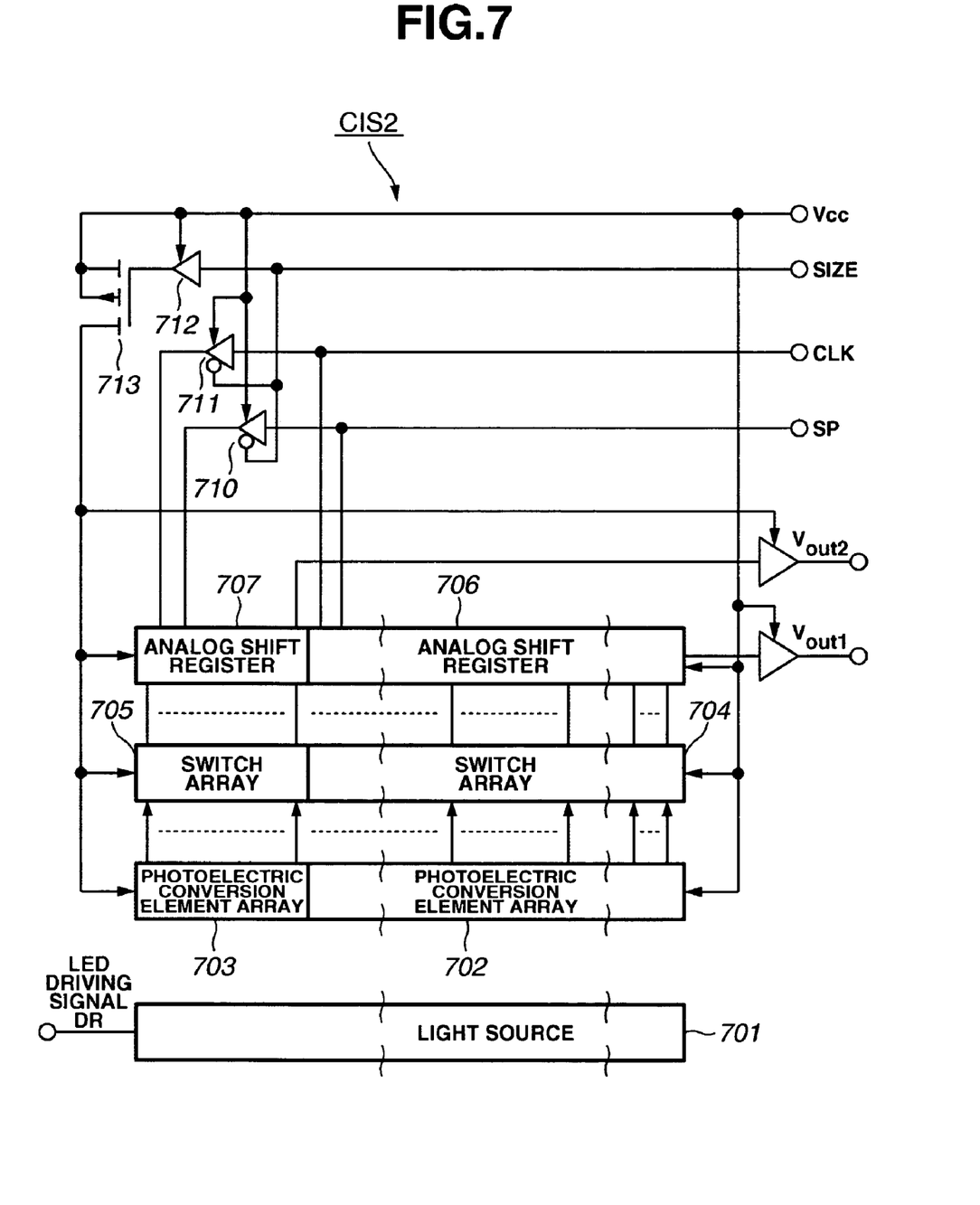
FIG. 7 is a schematic diagram showing the structure of a photoelectric conversion apparatus CIS2 according to a second embodiment of the invention.

FIG. 7 is a schematic diagram showing the structure of a photoelectric conversion apparatus CIS2 according to a second embodiment of the invention.

The photoelectric conversion apparatus CIS2 includes a light source 701, photoelectric conversion element arrays 702 and 703, switch arrays 704 and 705, analog shift registers 706 and 707, output buffers 708 and 709, a signal-SP buffer 710, a signal-CLK buffer 711, a signal-SIZE buffer 712 and a power supply stop circuit 713.

Similar to the photoelectric conversion apparatus CIS1 described in the first embodiment, the photoelectric conversion apparatus CIS2 operates in accordance with the clock signal CLK, the signal SP synchronized with the clock signal CLK, the LED driving signal DR and the signal SIZE.

An LED (light emitting diode) of the light source 701 emits light in response to the LED driving signal DR. Light from the light source 701 is reflected from an original (document). The photoelectric conversion element arrays 702 and 703 receive the reflected light from the original and generate and store electric charge. After completion of such storage, outputs of the photoelectric conversion element arrays 702 and 703 are transferred to the analog shift registers 706 and 707 via the switch arrays 704 and 705, respectively, in accordance the signal CLK and are then subjected to amplification and noise removal by the output buffers 708 and 709, respectively. Then, the output buffers 708 and 709 output signals $V_{out1}$ and $V_{out2}$, respectively, to the outside.

In addition, the photoelectric conversion element array 703, the switch array 705 and the analog shift register 707 are driven in accordance with output signals from the signal-SP buffer 710, the signal-CLK buffer 711, the signal-SIZE buffer 712 and the power supply stop circuit 713.

When an ordinary reading operation is performed, timing of the various control signals is the same as that of the first embodiment shown in FIG. 2.

If driving of a part of the photoelectric conversion apparatus CIS2 is to be stopped, the level of the signal SIZE is should be set high (H). This causes output signals from the signal-SP buffer 710 and the signal-CLK buffer 711 to change to a high-impedance state. At the same time, the power supply stop circuit 713 stops supplying power from a power source Vcc. As a result, supplying power to the photoelectric conversion element array 703, the switch array 705, the analog shift register 707 and the output buffer 709 is stopped. Thus, driving of a part of the photoelectric conversion apparatus CIS2 is stopped.

While, in the above-described embodiments, a contact image sensor is used for an image reading apparatus, a CCD (charge-coupled device) using a reduction optical system may also be used in the same manner and with the same effect as described above.

If the same configuration as described above is applied to a photoelectric conversion portion or image reading portion of a copy machine, facsimile machine, multifunction machine or the like, the same effect can be obtained.

In the first embodiment, only a portion corresponding to the scanning length for size A4R is driven while driving of a part of the photoelectric conversion apparatus CIS1 having the scanning length for size A3 is stopped. However, the photoelectric conversion apparatus CIS1 may be configured to respond to a plurality of scanning lengths. More specifically, in order to respond to detection of size B5R, B5 and B4, two driving stop means as described above may be additionally provided. In addition, the photoelectric conversion apparatus CIS1 may be configured such that driving for every chip or pixel can be individually controlled. Moreover, a register for designating the scanning length may be provided and a driving stop means individually provided for every pixel may be driven in accordance with the designation of the scanning length.

As described above, according to one embodiment of the invention, a photoelectric conversion apparatus includes photoelectric conversion elements configured to receive light reflected from an original illuminated by a light source and to convert the received light into an electrical signal, output means for amplifying the electrical signal from the photoelectric conversion elements and outputting the amplified signal as an image signal in a time series fashion, and driving stop means for stopping driving a part of the photoelectric conversion elements.

Furthermore, according to one embodiment of the invention, a photoelectric conversion apparatus includes photoelectric conversion elements configured to receive light reflected from an original illuminated by a light source and to convert the received light into an electrical signal, output means for amplifying the electrical signal from the photoelectric conversion elements and outputting the amplified signal as an image signal in a time series fashion, and power supply stop means for stopping supplying power to a part of the photoelectric conversion elements.

Furthermore, according to one embodiment of the invention, an image reading apparatus includes a photoelectric conversion apparatus including photoelectric conversion elements configured to receive light reflected from an original illuminated by a light source and to convert the received light into an electrical signal, and output means for amplifying the electrical signal from the photoelectric conversion elements and outputting the amplified signal as an image signal in a time series fashion, driving stop means for stopping driving a part of the photoelectric conversion elements, detection means for detecting a size of the original, and control means for controlling the driving stop means to stop driving a part of the photoelectric conversion elements when the detection means detects that the original is narrower than a scanning length in the photoelectric conversion apparatus.

Furthermore, according to one embodiment of the invention, an image reading apparatus includes a photoelectric conversion apparatus including photoelectric conversion elements configured to receive light reflected from an original illuminated by a light source and to convert the received light into an electrical signal, and output means for amplifying the electrical signal from the photoelectric conversion elements and outputting the amplified signal as an image signal in a time series fashion, power supply stop means for stopping supplying power to a part of the photoelectric conversion elements, detection means for detecting a size of the original, and control means for controlling the power supply stop means to stop supplying power to a part of the photoelectric conversion elements when the detection means detects that the original is narrower than a scanning length in the photoelectric conversion apparatus.

In the above-described embodiment, the image reading apparatus may be configured such that, when the detection means detects that the original is narrower than a scanning length in the photoelectric conversion apparatus, the control means drives the driving stop means and changes a storage time (read time) in the photoelectric conversion elements.

Furthermore, in the above-described embodiment, the image reading apparatus may be configured such that, when the detection means detects that the original is narrower than a scanning length in the photoelectric conversion apparatus, the control means drives the power supply stop means and changes a storage time (read time) in the photoelectric conversion elements.

Furthermore, in the above-described embodiment, the image reading apparatus may be configured such that, when the detection means detects that the original is narrower than a scanning length in the photoelectric conversion apparatus, the control means drives the driving stop means and changes a cycle, a duty ratio or the like of a driving signal for driving the photoelectric conversion apparatus.

Furthermore, in the above-described embodiment, the image reading apparatus may be configured such that, when the detection means detects that the original is narrower than a scanning length in the photoelectric conversion apparatus, the control means drives the power supply stop means and changes a cycle, a duty ratio or the like of a driving signal for driving the photoelectric conversion apparatus.

According to the above-described embodiment, driving photoelectric conversion elements that are located in an area other than an area corresponding to the width of an original (document) can be stopped, thus reducing electric power consumption when an original that is narrower than the maximum scanning length in the photoelectric conversion apparatus or the image reading apparatus is read.

Furthermore, according to the above-described embodiment, when driving a part of the photoelectric conversion elements is stopped, a storage time can be shortened, so that a time length required for reading an original can also be shortened.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-080226 filed Mar. 19, 2004, which is hereby incorporated by reference herein.

What is claimed is:

1. A photoelectric conversion apparatus in which photo electric conversion elements receive light reflected from an original illuminated by a light source, signals stored in the photoelectric conversion elements are amplified and the amplified signals are output as image signals in a time-series fashion, the photoelectric conversion apparatus comprising:

power supply stop means for stopping supplying power to a part of the photoelectric conversion apparatus; and output means for performing, in parallel, data reading from the part of the photoelectric conversion apparatus, to which power supply is stopped and data reading from other part of the photoelectric conversion apparatus, to which power supply is not stopped, wherein, when power supply to the part of the photoelectric conversion apparatus is not stopped by the power supply stop means, the output means performs, in parallel, data reading from the part of the photoelectric conversion apparatus and data reading from the other part of the photoelectric conversion apparatus.

2. A reading apparatus having a photoelectric conversion apparatus in which photoelectric conversion elements receive light reflected from an original illuminated by a light source, signals stored in the photoelectric conversion elements are amplified and the amplified signals are output as image signals in a time-series fashion, the reading apparatus comprising:

power supply stop means for stopping supplying power to a part of the photoelectric conversion apparatus;

control means for controlling the power supply stop means to stop power supply to the part of the photoelectric conversion apparatus when a size of the original is detected and a width of the original is detected to be narrower than a scanning length in the photoelectric conversion apparatus; and     output means for performing, in parallel, data reading from the part of the photoelectric conversion apparatus, to which power supply is stopped and data reading from the other part of the photoelectric conversion apparatus, to which power supply is not stopped,     wherein, when it is judged that data reading is to be performed with the scanning length in the photoelectric conversion apparatus based on the detected size of the original, the control means does not make the power supply stop means stop power supply to the part of the photoelectric conversion apparatus, and output means performs, in parallel, data reading from the part of the photoelectric conversion apparatus and data reading from the other part of the photoelectric conversion apparatus.

* * * * *